US008605035B2

(12) United States Patent
Lum et al.

(10) Patent No.: US 8,605,035 B2
(45) Date of Patent: Dec. 10, 2013

(54) BACKLIGHTING FOR OPTICAL FINGER NAVIGATION

(75) Inventors: Chee Foo Lum, Bayan Lepas (MY); Hun Kwang Lee, Simpang Ampat (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 873 days.

(21) Appl. No.: 12/771,240

(22) Filed: Apr. 30, 2010

(65) Prior Publication Data

US 2011/0267268 A1  Nov. 3, 2011

(51) Int. Cl.
*G06F 3/033* (2013.01)

(52) U.S. Cl.
USPC .......................................... 345/158; 345/175

(58) Field of Classification Search
USPC ..................... 345/156–178; 178/18.01–18.11
See application file for complete search history.

(56) References Cited

U.S. PATENT DOCUMENTS

| 6,011,860 | A | 1/2000 | Fujieda et al. |
| 7,755,029 | B2* | 7/2010 | Tang et al. ..................... 250/239 |
| 8,081,162 | B2* | 12/2011 | Teoh et al. .................... 345/166 |
| 8,290,707 | B2* | 10/2012 | Skarine ......................... 701/457 |
| 2007/0007442 | A1 | 1/2007 | Wenstrand et al. |
| 2007/0138377 | A1 | 6/2007 | Zarem |
| 2007/0291164 | A1 | 12/2007 | Goh et al. |
| 2009/0159788 | A1 | 6/2009 | Tang et al. |
| 2011/0205154 | A1* | 8/2011 | Lowles et al. ................. 345/157 |
| 2011/0205179 | A1* | 8/2011 | Braun ............................ 345/174 |

* cited by examiner

Primary Examiner — Vijay Shankar

(57) ABSTRACT

An optical finger navigation (OFN) device includes an OFN sensor module, a light source, and a vertical light guide. The OFN sensor module is coupled to a circuit substrate. The OFN sensor module generates a navigation signal in response to a movement detected at a navigation surface based on light reflected from a user's finger. The light source is also coupled to the circuit substrate. The light source generates light (which is separate from the light generated for the OFN sensor module). The vertical light guide is disposed to circumscribe a perimeter of the OFN sensor module. The vertical light guide receives the light from the light source and guides the light toward a light emission surface at a perimeter surface area circumscribing the navigation surface.

20 Claims, 12 Drawing Sheets

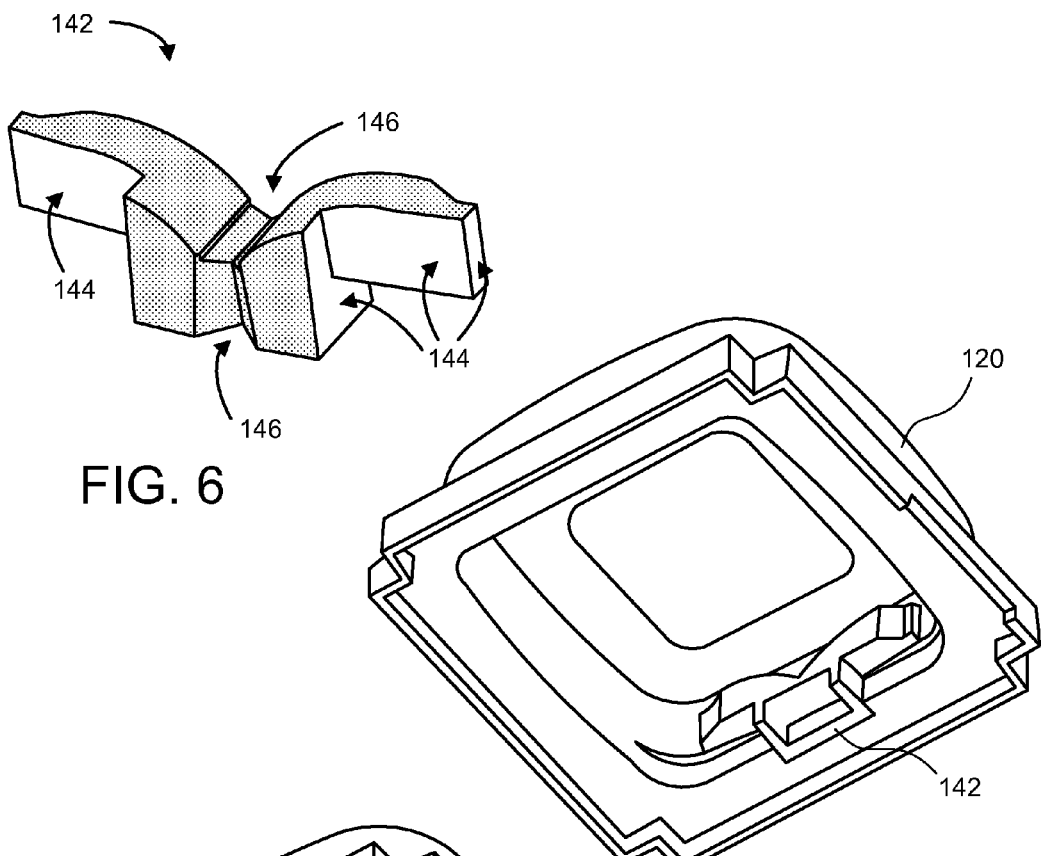
FIG. 6
FIG. 7
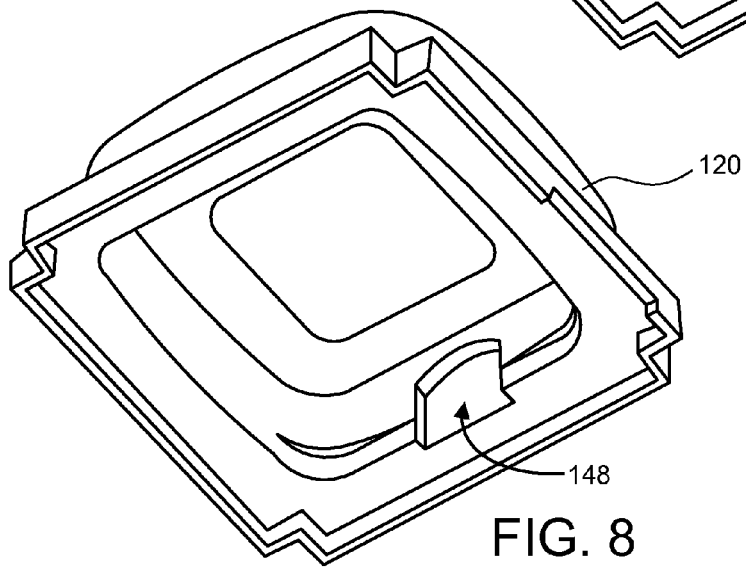
FIG. 8

BACKLIGHTING FOR OPTICAL FINGER NAVIGATION

BACKGROUND

An impressive feature of optical finger navigation (OFN) devices is the ability to seamlessly integrate such devices into consumer electronics. OFN devices have many advantages over other types of navigational input devices. For example OFN devices do not have mechanical, moving parts. So there is no fear of mechanical failures. OFN devices can also be very precise, depending on the resolution of the sensor that is used for imaging the user's finger.

However, despite these advantages, it has been recognized that some implementations of OFN devices can be integrated so well that it is difficult for a user to identify the location of the OFN device. For example, the contact navigation surface for an optical finger navigation device can be finished to appear the same or very similar as surrounding finishes (i.e., black plastic, etc.). Thus, a user may have difficulty identifying the location of the OFN device relative to the surrounding components having a similar finish.

SUMMARY

Embodiments of an optical finger navigation (OFN) device are described. In one embodiment, the OFN device includes an OFN sensor module, a light source, and a vertical light guide. The OFN sensor module is coupled to a circuit substrate. The OFN sensor module generates a navigation signal in response to a movement detected at a navigation surface based on light reflected from a user's finger. The light source is also coupled to the circuit substrate. The light source generates light (which is separate from the light generated for the OFN sensor module). The vertical light guide is disposed to circumscribe a perimeter of the OFN sensor module. The vertical light guide receives the light from the light source and guides the light toward a light emission surface at a perimeter surface area circumscribing the navigation surface. Other embodiments of the OFN device are also described.

Embodiments of light guide assembly are also described. In one embodiment, the light guide assembly is configured for use with an OFN device which generates a navigation signal in response to a movement detected at a navigation surface based on light reflected from a user's finger. An embodiment of the light guide assembly includes a housing and a vertical light guide. The housing includes vertical walls formed of a substantially opaque material. The housing defines an interior space with dimensions sufficient to house an OFN sensor module. The housing also defines a navigation window for alignment between a sensor array location of the OFN sensor module and a navigation surface. The vertical light guide includes vertical walls formed of a substantially translucent material. The vertical light guide guides light from a light source approximately at a base of the vertical light guide toward a light emission surface which circumscribes at least a portion of the navigation window defined by the housing. Other embodiments of the light guide assembly are also described.

Embodiments of a computerized device are also described. In one embodiment, the computerized device is a handheld mobile phone or mobile computing device. An embodiment of the computerized device includes a screen, an OFN device, and an effect lighting apparatus. The screen provides a visual display of a graphical image. The OFN device detects user inputs based on light reflected from a user's finger at a navigation surface to manipulate at least a portion of the graphical image on the screen. The effect lighting apparatus is disposed to circumscribe the navigation surface of the OFN device. The effect lighting apparatus provides a visual indicator of a location of the navigation surface of the OFN device relative to the screen, without interfering with the functionality of the OFN device. Other embodiments of the computerized device are also described. For example, in some embodiments, the OFN device only provides visual feedback to a user via an image manipulation on the screen.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 6 depicts a perspective view of one embodiment of the light pipe of FIG. 5.

FIG. 7 depicts a perspective view of another embodiment of the vertical light guide and the light pipe of FIG. 5.

FIG. 8 depicts a perspective view of another embodiment of the vertical light guide of FIG. 5.

Throughout the description, similar reference numbers may be used to identify similar elements.

DETAILED DESCRIPTION

Figure 1:
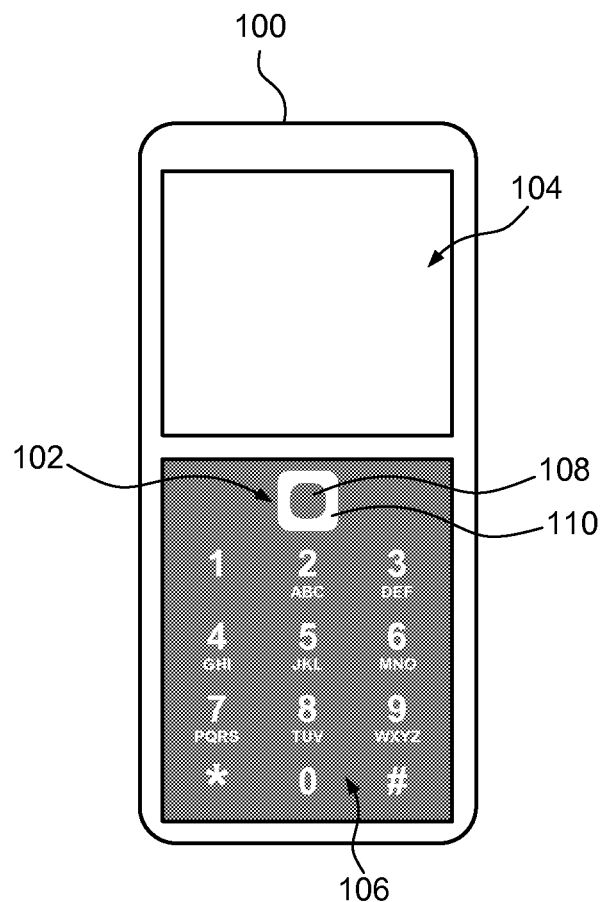
FIG. 1 depicts a schematic diagram of one embodiment of a consumer electronic device having an optical finger navigation (OFN) device.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments relate to an optical finger navigation (OFN) device that includes one or more features to help a user identify the location of the OFN device relative to surrounding components and/or surface finishes. In general, the OFN device includes a light feature which at least partially surrounds the navigation window (e.g., the contact surface) of the corresponding OFN sensor module. During use of the OFN device, the light feature illuminates to indicate the location of the OFN device to the user. Additionally, the light feature may illuminate before an anticipated user interaction (e.g., upon waking up from a sleep mode), after an actual user interaction, or at another time.

In a specific embodiment, the OFN device includes the OFN sensor module, a light source, and a vertical light guide. The OFN sensor module is coupled to a circuit substrate (directly or indirectly). The OFN sensor module generates a navigation signal in response to a movement detected at a navigation surface based on light reflected from a user's finger. The light source is also coupled to the circuit substrate (directly or indirectly). The light source generates light (which is separate from the light generated for the OFN sensor module). The vertical light guide is disposed to circumscribe a perimeter of the OFN sensor module. The vertical light guide receives the light from the light source and guides the light toward a light emission surface at a perimeter surface area circumscribing the navigation surface.

FIG. 1 depicts a schematic diagram of one embodiment of a consumer electronic device 100 having an optical finger navigation (OFN) device 102. The consumer electronic device 100 may be any type of electronic device such as a mobile telephone, personal digital assistant (PDA), laptop or notebook computer, and so forth. Although not shown, embodiments of the OFN device 102 also may be incorporated into non-consumer electronic devices. Additionally, some devices may include multiple OFN devices 102, or other quantities or configurations of OFN devices 102.

The illustrated electronic device 100 includes a display screen 104 and a keypad 106, in addition to the OFN device 102. Conventional types of screens 104 and keypads 106 and their corresponding uses are known in the art and, hence, are not described in more detail herein. Although the electronic device 100 is shown and described with certain components and functionality, other embodiments of the electronic device 100 may include fewer or more components to implement less or more functionality.

Figure 11:
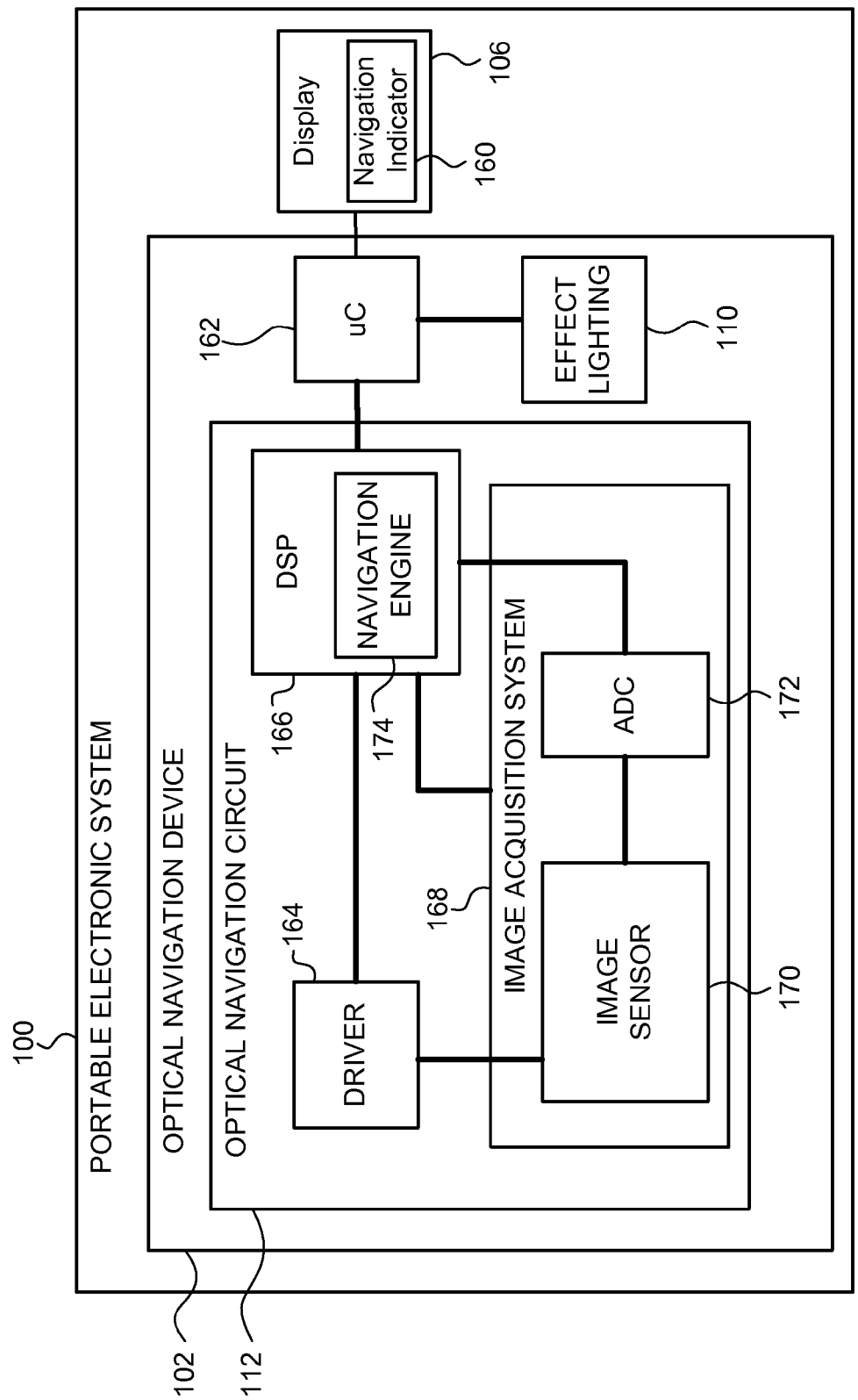
FIG. 11 depicts a schematic block diagram of one embodiment of the electronic device of FIG. 1.

In one embodiment, the OFN device 102 includes a navigation window 108 at which a user's finger is imaged or otherwise detected by an image sensor (refer to FIG. 11). The navigation window 108 generally corresponds with a surface area that is within the field of view of the image sensor.

The OFN device 102 also includes an effect lighting apparatus 110 (i.e., a light feature) that circumscribes, or surrounds, the navigation window 108. In some embodiments, the effect lighting apparatus 110 is directly adjacent to and circumscribes the navigation window 108. However, in other embodiments, the effect lighting apparatus 110 is need necessarily directly adjacent to the navigation window 108, but is simply located within a proximity of the navigation window 108 so that the user can identify the location of the navigation window 108. Additionally, in some embodiments, the effect lighting apparatus 110 does not necessarily fully circumscribe the navigation window 108. In other embodiments, the effect lighting apparatus 110 may include multiple illuminated portions which may be collocated together. For example, the effect lighting apparatus 110 may include two illuminated, parallel lines interposed between the navigation window 108 and the keypad 106 (or the display 104). In another example, the multiple illuminated portions may be located separately, relative to the navigation window 108. For example, one illuminated portion may be located on one side of the navigation window 108, and another illuminated portion may be located on another side of the navigation window 108. Other embodiments may implement various quantities and/or arrangements of illuminated portions of the effect lighting apparatus 110.

It should also be noted that, in certain embodiments, the effect lighting apparatus 110 does not interfere with the functionality of the OFN sensor. More specifically, embodiments of the effect lighting apparatus 110 are designed and implemented to provide location identification illumination, without providing significant amounts of illumination at the navigation surface. In this way, the OFN sensor can operate in a known manner, without requiring modifications to account for stray light from the nearby effect lighting apparatus 110.

Figure 2:
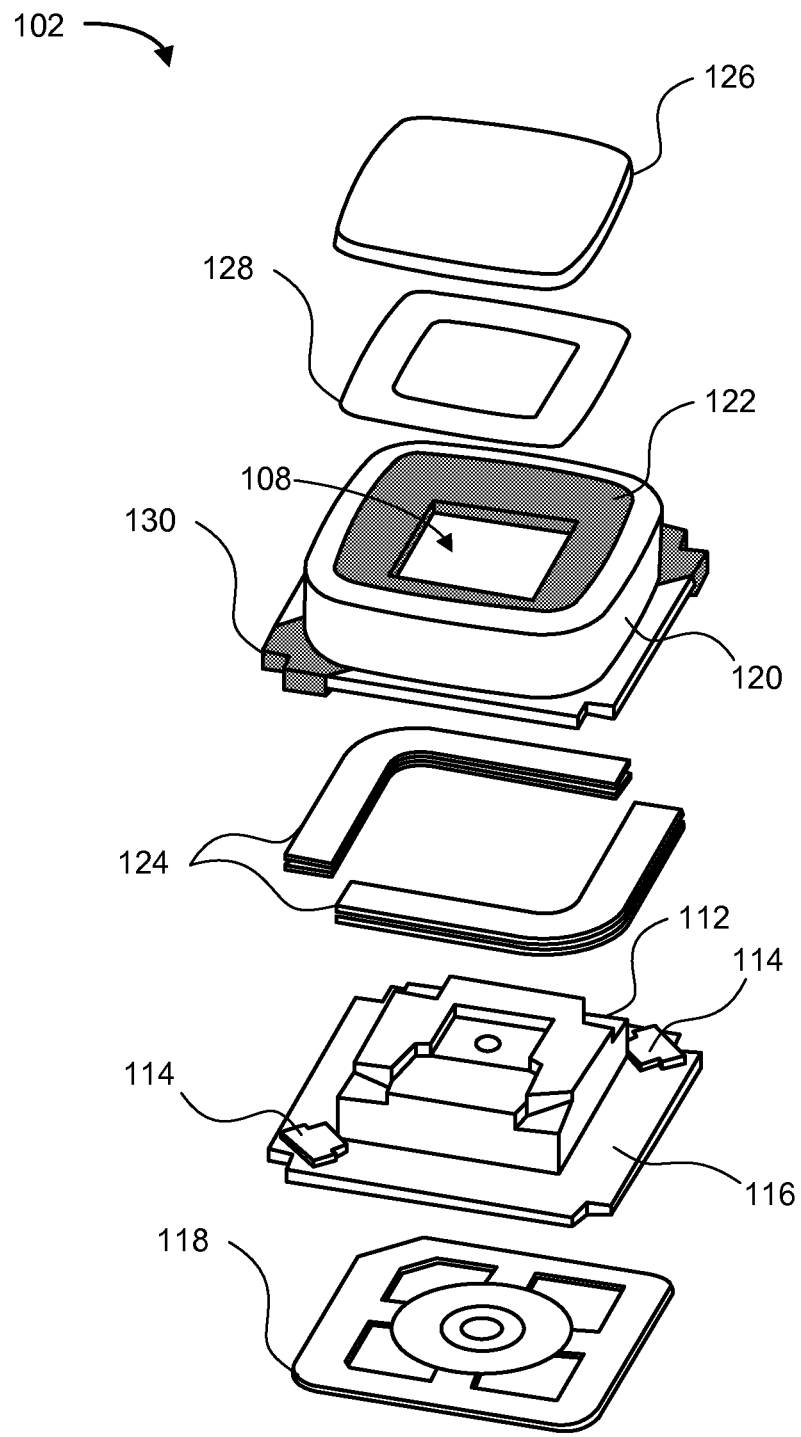
FIG. 2 depicts an exploded perspective view of one embodiment of the OFN device of FIG. 1.

FIG. 2 depicts an exploded perspective view of one embodiment of the OFN device 102 of FIG. 1. The illustrated OFN device 102 includes an OFN sensor module 112 and one or more light sources 114 coupled to a substrate 116. The substrate may be any type of suitable substrate such as a printed circuit board (PCB), flex, rigid flex, and so forth. The OFN device 102 also includes a mechanical switching device 118 such as a metal dome switch aligned with the OFN sensor module 112 (in this case, on a back side of the substrate 116. The OFN device 102 also includes a vertical light guide 120, an internal housing 122, one or more transitional light guides 124, and a navigation plate 126.

A detailed description of a specific embodiment of the OFN sensor module 112 is provided below with reference to FIG. 11. In general, the OFN sensor module 112 operates to generate a navigation signal in response to a movement of a user's finger at the navigation plate 126. The OFN sensor module 112 uses light generated by one or more internal light sources (refer to FIG. 11) which are different from the light sources 114 used for the vertical light guide 120. More information regarding the OFN sensor module 112 may be obtained from U.S. patent application Ser. No. 12/464,542, entitled "Composite Package for OFN," filed on May 12, 2009, which is incorporated herein by reference.

In one embodiment, each light source 114 for the vertical light guide 120 is a light emitting diode (LED). In a specific embodiment, the light sources 114 are side-firing or side-emitting LEDs. Other embodiments may use other types of LEDs (refer to the remaining figures) or other types of light sources. Although two separate light sources 114 are shown in FIG. 2, other embodiments may uses fewer or more light sources. For example, some embodiments use a single light source 114. Other embodiments use a light source 114 disposed at each corner of the OFN sensor module 112.

In the illustrated embodiment, each light source 114 emits light into the transitional light guides 124, which are disposed on (or coupled to) the substrate between the light source 114. In general, the transitional light guides 124 facilitate transmitting the light from the light sources 114 to the vertical light guide 120. In some embodiments, the OFN device 102 also includes a reflective coating or substance (e.g., white paint) disposed between the transitional light guides 124 and the substrate 116 to help increase the light transmission into the vertical light guide 120. In a specific embodiment, the transitional light guides 124 include a light guide film (LGF) to create a uniform back lighting effect. The LGF receives light from the light sources 114 and distributes the light along the top surface (near the vertical light guide 120) of the LGF. The LGF may be attached to the substrate 116 with double-sided tape or another type of adhesive or connector. The use of double-sided tape, or a similar adhesive material, may facilitate the attachment of the housing 122 and/or the vertical light guide 120 to the substrate 116 for assembly purposes. In another embodiment, plastic light pipe also can be used to create the same effect as LGF. In further embodiments, the transitional light guides 124 may be integrated with the vertical light guide 120 for improved functionality and/or cost savings.

In one embodiment, the vertical light guide 120 and the housing 122 are placed on top of the OFN sensor module 112. The vertical light guide 120 and the housing 122 may be formed together (e.g., as a two color molded part) or separately. If formed separately, the vertical light guide 120 and the housing 122 may be assembled together. In the illustrated embodiment, the housing 122 defines a navigation window which allows part or all of the navigation plate 126 to be within the field of view of the image sensor. In one embodiment, the housing 122 is opaque so that light within the vertical light guide 120 does not transmit into the field of view of the image sensor. In this way, the opaque housing 122 can act as a shield to prevent unwanted back light that would otherwise affect the OFN sensor module 112.

The illustrated housing 122 also includes flanges 130 to cover the corresponding light sources 114. The flanges 130 prevent some or all of the direct light emissions from the light sources 114, so that bright spots at the corners of the vertical light guide are avoided.

The vertical light guide 120 has a light emission surface which circumscribes the navigation window 108 approximately at the navigation surface of the navigation plate 126. In this way, the vertical light guide 120 provides illumination at about the navigation window 108 to help a user identify the location of the navigation window 108 and/or the navigation plate 126. However, in some embodiments, the vertical light guide 120 does not necessarily extend all the way to the opposite surface of the navigation plate 126. Rather, in some embodiment, a cover may be placed on top of the vertical light guide 120, and the cover may be substantially flush with the navigation plate 126. Other embodiments may use other arrangements for the vertical light guide, cover, and or similar structural components.

In some embodiments, the navigation plate 126 is adhered to the internal housing 122 by an adhesive tape 128. In other embodiments, the navigation plate 126 may be coupled with the housing 122 or another component of the OFN device 102 by another form of adhesive (e.g., glue) or by conventional mechanical means (e.g., snap, friction, etc.). The navigation plate 126 may be an infrared (IR) polycarbonate (PC) cover, or another suitable type of cover, that allows light generated within and reflected back into the OFN sensor module 112 to be detected by the image sensor. By using IR light, the potential interference from ambient visible light may be reduced or eliminated.

Figure 3:
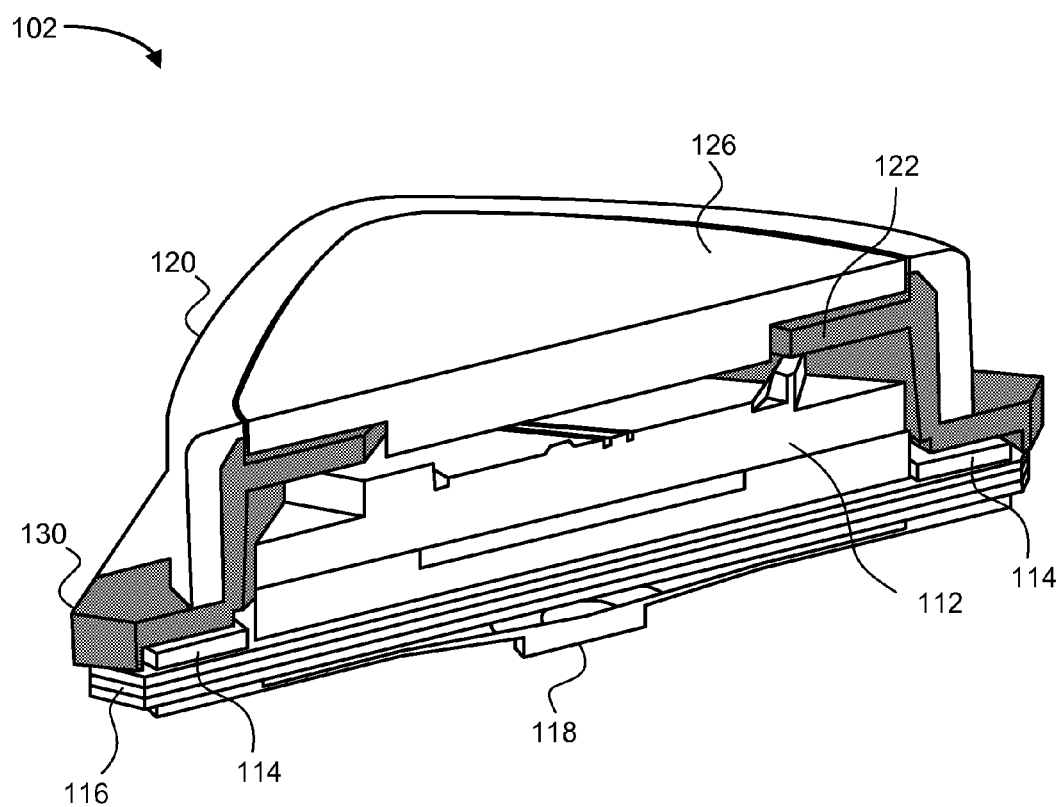
FIG. 3 depicts a cutaway view of an assembled embodiment of the OFN device of FIG. 1.

FIG. 3 depicts a cutaway view of an assembled embodiment of the OFN device 102 of FIG. 1. As illustrated in FIG. 3, the switching device 118 is mounted on a back side of the substrate 116, and the remaining components are mounted on a front side of the substrate 116. Specifically, the light sources 114 are mounted at the corners of the OFN sensor module 112. The housing 122 covers the OFN sensor module 112, and the flanges 130 cover the light sources 114. The vertical light guide 120 surrounds the housing 122 and circumscribes the navigation plate 126.

The embodiment illustrated in FIG. 3 specifically implements two side-firing LEDs, which are located diagonally across the OFN sensor module 112. Depending on the design of the OFN device 102, the transitional light guide (refer to FIG. 1) collects the light emitted by the LEDs and conveys the light to the vertical light guide 120 for a light distribution within the vertical light guide 120. In one embodiment, the vertical light guide 120 provides a substantially uniform light emission around the navigation plate 126 and the navigation window 108. In contrast to the two LED embodiment, an embodiment which uses four LEDs may have the LEDs located at each of the four corners. Accordingly, four transitional light guides 124 may be used—one between each pair of LEDs.

As explained above, the housing 122 prevents unwanted light from entering to the inner space of the housing where the OFN sensor module 112 is located. Consequently, even if there is a small amount of light that transmits from the vertical light guide 120 to edges of the navigation plate 126, the top flange of the housing 122 may substantially block such light leakage. Alternatively, there may be an additional light barrier material (not shown) between the vertical light guide 120 and the navigation plate 126.

To improve the visual effect and uniformity of the light emissions from the vertical light guide 120, a diffusion material may be applied to the top portion or surface of the vertical light guide 120. For example, translucent white paint may be applied on the top of the vertical light guide 120. Alternatively, or in additional to a first material, a non-conductive vacuum metallization (NCVM) may be applied to the top portion or surface of the vertical light guide 120. The paint or other diffusion material acts as a diffusion layer to smoothen the light emitted from the vertical light guide 120. The use of an additional vacuum metallization coating (e.g., NCVM)

with proper percentage of light transmittance may improve the visual appearance of the ring when the back lighting is turned off.

Figure 4:
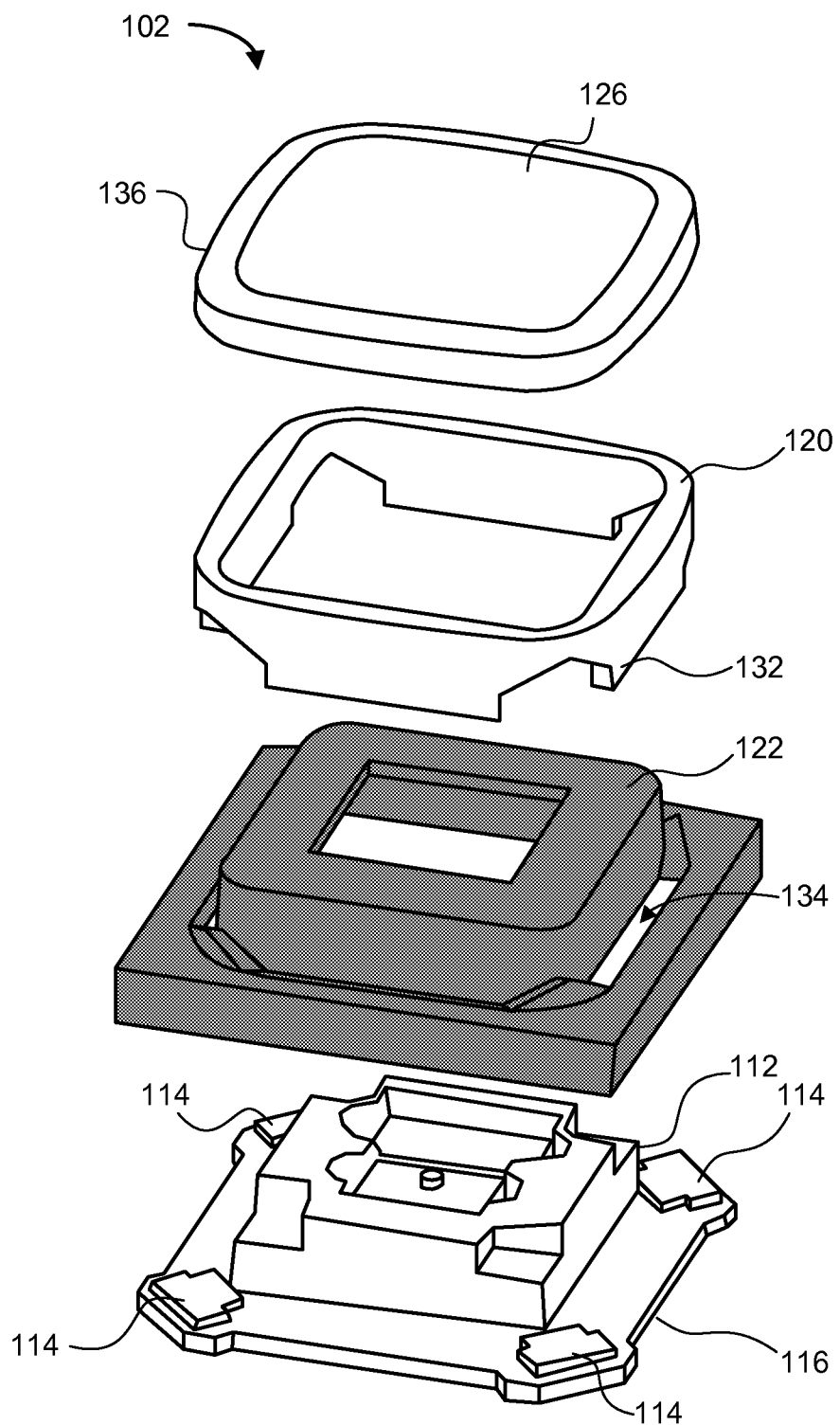
FIG. 4 depicts an exploded perspective view of another embodiment of the OFN device of FIG. 1.

FIG. 4 depicts an exploded perspective view of another embodiment of the OFN device 102 of FIG. 1. The illustrated embodiment includes four light sources 114 coupled to the substrate 116 around the OFN sensor module 112. In the depicted embodiment, the housing 122 is separate from the vertical light guide 120. However, the vertical light guide 120 includes tabs 132 which extend through corresponding openings 134 in the housing, so that light from the LEDs can enter into the vertical light guide 120. In one embodiment, the housing 122 includes light barriers over the LED locations, and the vertical light guide 120 includes angled bottom surfaces at corresponding locations in order to direct some of the light up at the corners of the vertical light guide 120.

The illustrated embodiment also includes an integrated cover plate 136. The integrated cover plate 136 includes both the navigation plate 126 and a diffuse transmission ring surrounding the centrally located navigation plate 126. The bottom surface of the diffuse transmission ring substantially aligns with the top surface of the vertical light guide 120, so that the light from the light sources 114 travels through the vertical light guide 120 and the diffuse transmission portion of the integrated cover plate 136. The diffuse transmission ring may be painted and/or coated (e.g., using NCVM) as described above.

Figure 5:
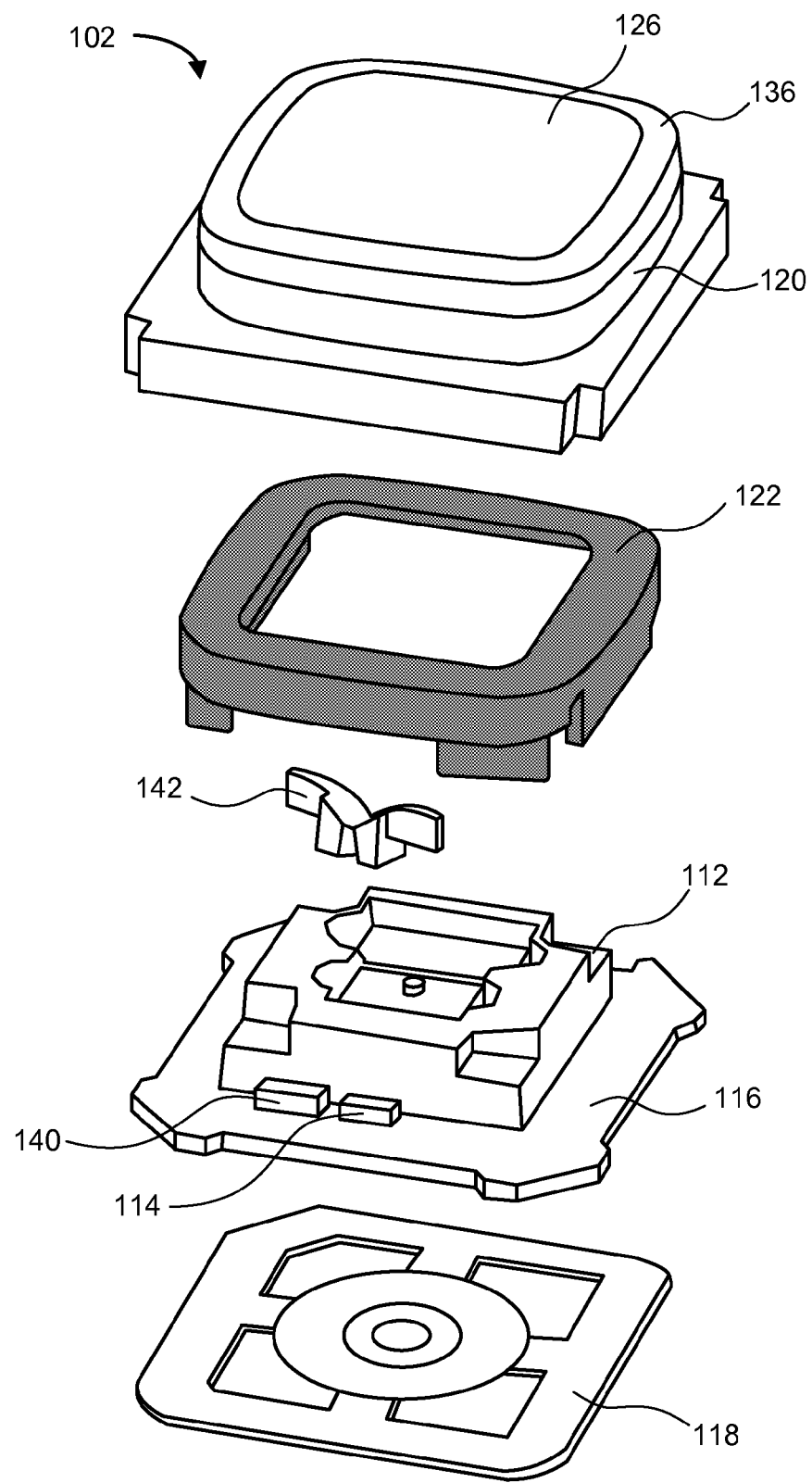
FIG. 5 depicts an exploded perspective view of another embodiment of the OFN device of FIG. 1.

FIG. 5 depicts an exploded perspective view of another embodiment of the OFN device 102 of FIG. 1. The illustrated embodiment includes the mechanical switching device 118, the substrate 116, and the OFN sensor module 112. The OFN device 102 also includes a single light source 114 and associated circuitry 140 (e.g., a capacitor). The OFN device 102 also includes the housing 122, the vertical light guide 120, and the integrated cover 136 with the navigation plate 126. All of these components are similar to the embodiments described above in structure and/or function.

The illustrated OFN device 102 also includes a separate light pipe 142 that functions as a transitional light guide to transmit the light from the light source 114 to the vertical light guide 120. FIG. 6 depicts a perspective view of one embodiment of the light pipe 142 of FIG. 5. The light pipe 142 includes a bottom surface to receive light from the light source 114, which in one embodiment is a top-firing LED. The light pipe 142 also includes opposing protrusions (i.e., wings) which extend in a direction substantially parallel to the bottom surface. These protrusions direct the light outward in a direction that is substantially orthogonal to the direction of the light emitted from the top-firing LED.

One or more of the surfaces (shown shaded in FIG. 6) may be coated with a reflective material in order to facilitate internal reflections in the appropriate directions. Other embodiments may use other types of reflective properties and/or materials. The light exits the light pipe 142 through other surfaces 144 that are not coated with the reflective material. In some embodiments, the light pipe 142 also includes one or more notches 146 that are located to direct the internally reflected light toward the exit surfaces 144. In the illustrated embodiment, the notches 146 are substantially V-shaped, although other embodiments may use other geometries of the light pipe 142.

FIG. 7 depicts a perspective view of another embodiment of the vertical light guide 120 and the light pipe 142 of FIG. 5. As illustrated in FIG. 7, the light pipe 142 is shown engaged with an interior surface of the vertical light guide 120. FIG. 7 also illustrates the bottom surface of the light pipe 142, which may be shaped with a channel, or other depression, to receive part or all of the corresponding structure of the light source 114.

FIG. 8 depicts a perspective view of another embodiment of the vertical light guide 120 of FIG. 5. In the illustrated embodiment, the light pipe 142 is not shown, but a receiver indentation 148 is shown where the light pipe 142 might be engaged. The shape of the receiver indentation 148 may vary depending on the corresponding shape of the light pipe 142. Other embodiments may omit the receiver indentation 148.

Figure 9:
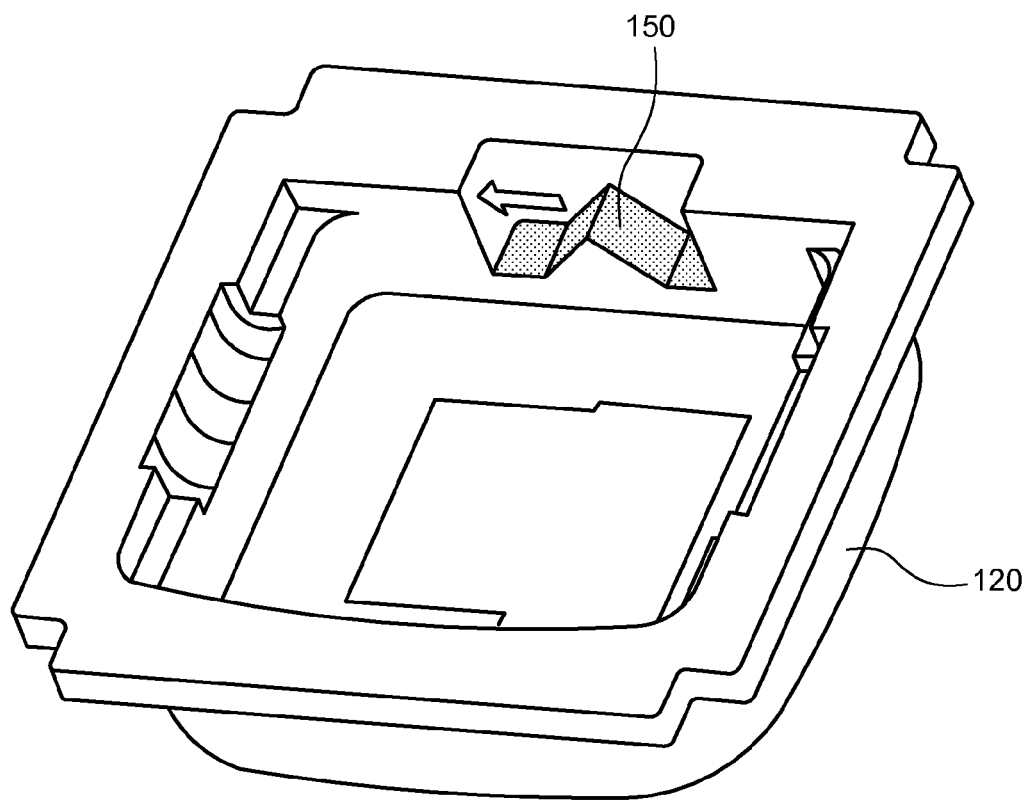
FIG. 9 depicts a bottom perspective view of another embodiment of the vertical light guide.
Figure 10:
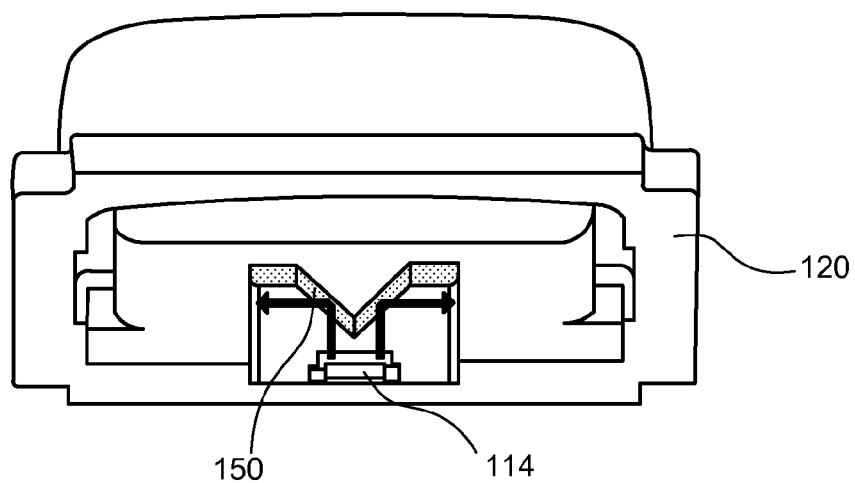
FIG. 10 depicts a cutaway view of another embodiment of the OFN device and the vertical light guide of FIG. 9.

FIG. 9 depicts a bottom perspective view of another embodiment of the vertical light guide 120. FIG. 10 depicts a cutaway view of another embodiment of the OFN device 102 and the vertical light guide 120 of FIG. 9. In the illustrated embodiments, a separate light pipe is not needed because the interior surfaces 150 of the vertical light guide 120 are shaped to perform similar functionality. In one embodiment, the interior surfaces 150 of the vertical light guide 120 are angled to reflect the light into other surfaces of the vertical light guide (as indicated by the arrows). The angled surfaces, as well as other surfaces, may be coated with a reflective material, or may be otherwise finished as a reflective surface.

FIG. 11 depicts a schematic block diagram of one embodiment of the electronic device 100 of FIG. 1. In one embodiment, the electronic device 100 is a portable electronic device. The illustrated electronic device 100 includes the OFN device 102 and the display 104. The display 104 may display a navigation indicator 160 or any other type of conventional display content.

By implementing an embodiment of the OFN device 102 in the portable electronic system 100, the OFN device 102 may facilitate, for example, user input to navigate content on a display device 104. For example, the OFN device 102 may facilitate control of the navigation indicator 160 on the display device 104. The navigation indicator 160 may be a cursor, a highlighter, an arrow, or another type of navigation indicator. Additionally, the user input received through the OFN device 102 may facilitate other types of user-controlled functionality including, but not limited to, volume controls, audio playback selections, browser controls, bio-metric identification, electronic musical instruments, actions in games, and so forth. The types of user-controlled functionality that may be implemented with embodiments of the electronic system 100 may depend on the type of functionality generally provided by the electronic system 100. Also, although FIG. 11 specifically illustrates a portable electronic system 100, other embodiments may implement the OFN device 102 in electronic devices which are portable, but not necessarily held in a user's hand, or devices which are generally considered to be not portable.

The illustrated OFN device 102 includes an optical navigation circuit 112 (also referred to as the sensor module) and a microcontroller (uC) 162. In general, the optical navigation circuit 112 generates signals representative of finger or other navigation movement at the OFN device 102. The optical navigation circuit 112 then transmits one or more signals to the microcontroller 162. Examples of types of signals transmitted from the optical navigation circuit 112 to the microcontroller 162 include channel quadrature signals based on $\Delta X$ and $\Delta Y$ relative displacement values. The $\Delta X$ and $\Delta Y$ displacement values may represent a specific pattern for finger print identification or a vector of displacement, direction, and magnitude. These signals, or other signals, may be indicative of a relative movement between the finger and the OFN device 102. Other embodiments of the optical navigation circuit 112 may transmit other types of signals to the microcontroller 162.

In some embodiments, the microcontroller 162 implements a variety of functions, including transmitting data to and receiving data from a host computer system or other electronic device (not shown) or acting on the displacement values. In one embodiment, the microcontroller 162 also controls the effect lighting apparatus 110, which is described in various embodiments herein.

In order to generate the navigation signals, the depicted optical navigation circuit 112 includes a driver 164, a digital signal processor (DSP) 166, and an image acquisition system (IAS) 168. The image acquisition system 168 includes the image sensor 170 and an analog-to-digital converter (ADC) 172. Other embodiments of the optical navigation circuit 112 and or the image acquisition system 168 may include fewer or more components to implement less or more functionality.

In one embodiment, the driver 164 of the optical navigation circuit 112 controls the operation of an internal light source (not shown) to generate the light signal that illuminates the navigation surface. The driver 164 may control the light source to several different brightness levels, or the driver 164 may pulse the light source in conjunction with sending detector on/off signals to the image sensor 170, thereby increasing the system response function for desirable goals. The reflected light signal is then received and detected by the image sensor 170.

In one embodiment, the image sensor 170 generates one or more analog electrical signals corresponding to incident light on the image sensor 170. The image sensor 170 then transmits the analog signals to the analog-to-digital converter 172. The analog-to-digital converter 172 converts the electrical signals from analog signals to digital signals and then passes the digital signals to the digital signal processor 166.

After the digital signal processor 166 receives the digital form of the signals from the analog-to-digital converter 172 of the image acquisition system 168, the digital signal processor 166 may perform additional processing using the electrical signals. The digital signal processor 166 then transmits one or more signals to the microcontroller 162, as described above. In some embodiments, the digital signal processor 166 includes a navigation engine 174 to generate lateral movement information based on lateral movement of the finger relative to the navigation surface of the navigation plate 126. Other embodiments of the navigation engine 174 may generate other types of movement information.

More specifically, in one embodiment, the image sensor 170 may include an array of distinct photodetectors (not shown), for example, a 16×16 or 32×32 array of distinct photodetectors configured to detect light that is reflected from the illuminated spot on the navigation surface. Each of the photodetectors in the image sensor 170 generates light intensity information that is output as a digital value (e.g., an 8-bit digital value). Image information is captured by the image sensor 170 in frames, where a frame of image information includes a set of simultaneously captured values for each distinct photodetector in the image sensor 170. The rate of image frame capture and tracking resolution can be programmable. In an embodiment, the image frame capture rate ranges up to 2,300 frames per second with a resolution of 800 counts per inch (CPI). Although some examples of frame capture rates and resolutions are provided, different frame capture rates and resolutions are contemplated.

The navigation engine 174 compares successive image frames from the image sensor 170 to determine the movement of image features between frames. In particular, the navigation engine 174 determines movement by correlating common features that exist in successive image frames from the image sensor 170. The movement between image frames is expressed in terms of movement vectors in, for example, X and Y directions (e.g., $\Delta X$ and $\Delta Y$). The movement vectors are then used to determine the relative movement between a user's finger and the image sensor 170. More detailed descriptions of examples of navigation sensor movement tracking techniques are provided in U.S. Pat. No. 5,644,139, entitled NAVIGATION TECHNIQUE FOR DETECTING MOVEMENT OF NAVIGATION SENSORS RELATIVE TO AN OBJECT, and U.S. Pat. No. 6,222,174, entitled METHOD OF CORRELATING IMMEDIATELY ACQUIRED AND PREVIOUSLY STORED FEATURE INFORMATION FOR MOTION SENSING, both of which are incorporated by reference herein.

Figure 12:
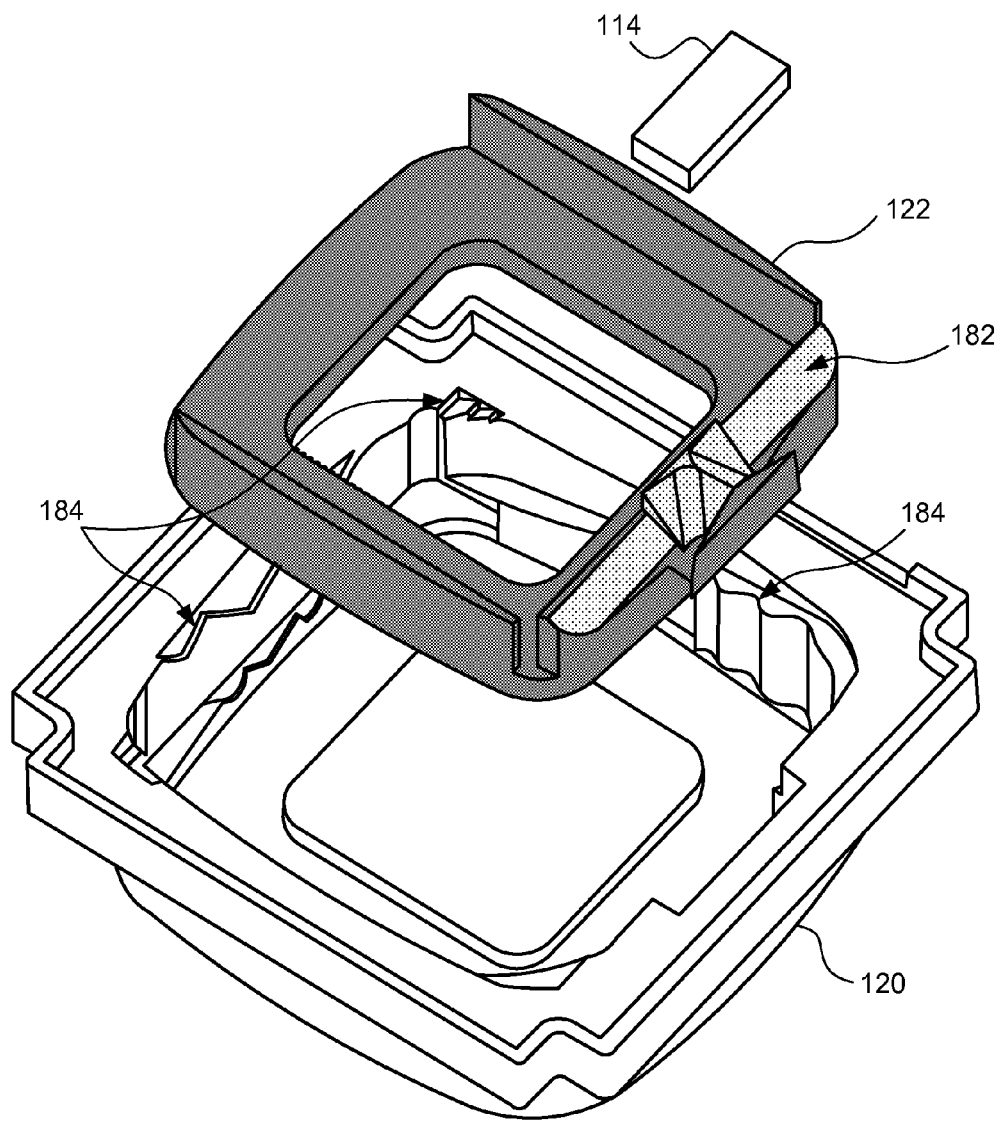
FIG. 12 depicts an exploded perspective view of another embodiment of the light source, housing, and vertical light guide of the OFN device.

FIG. 12 depicts an exploded perspective view of another embodiment of the light source 114, housing 122, and vertical light guide 120 of the OFN device 100. In the illustrated embodiment, the housing 122 includes one or more surfaces 182 that function to reflect light from the light source 114 into the vertical light guide 120. In one embodiment, the surfaces 182 of the vertical light guide 120 are angled to reflect the light into other surfaces of the vertical light guide 120. The angle is a non-zero angle relative to the plane of the substrate (refer to FIG. 1). In some embodiments, the housing 122 includes multi-faceted surfaces 182 on which the light from the light source 114 is incident. By implementing the multi-faceted surfaces 182 on the housing 122, the light from the light source 114 may be reflected in various directions in order to facilitate distributing the light more evenly within the vertical light guide 120.

The angled surfaces 182, as well as other surfaces, may be coated with a reflective material, or may be otherwise finished as a reflective surface. In one embodiment, a NVCM coating is applied to the indicated surfaces 182 in order to create a mirror-like or otherwise reflective finish. In some embodiments, the angled surfaces 182 of the housing 122 also function to block or limit light from entering into the interior cavity where the image sensor is located.

The illustrated vertical light guide 120 also includes various light distribution features 184 that are integrated into the vertical light guide 120. In general, the light distribution features 184 function to distribute the light within the vertical light guide 120 by way of total internal reflection (TIR) or other optical transmission effects. Various types of light distribution features 184 are shown, including undulating sidewalls, tiered surfaces, serration detents, and so forth. Other embodiments may include other types of light distribution features 184 and or other combinations of light distribution features 184. Additionally, the exact locations of each type and/or quantity of light distribution features 184 may vary depending on the implementation of the vertical light guide. In some embodiments, a higher quantity of the light distribution features 184 are located at regions such as corners of the vertical light guide 120, where light can be directed around the corner using TIR or upward and out of the vertical light guide 120 for perception by the user.

Figure 13:
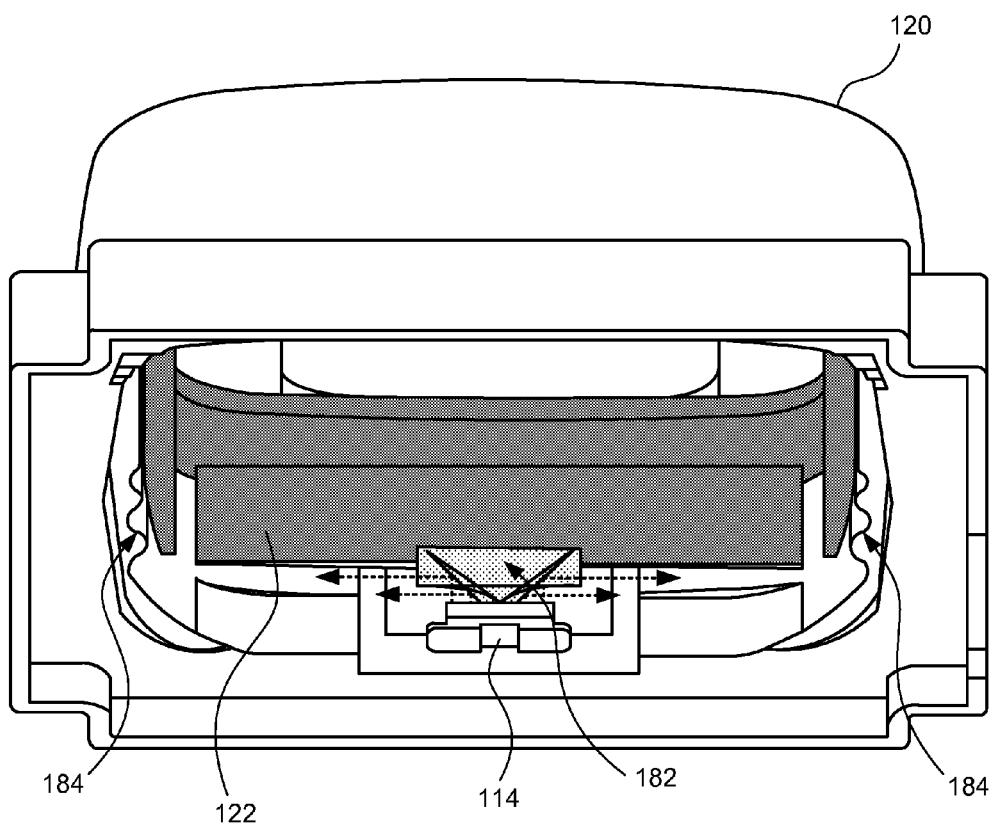
FIG. 13 depicts another perspective view of the OFN device of FIG. 12.

FIG. 13 depicts another perspective view of the OFN device 100 of FIG. 12. Like FIG. 12, the illustrated portions of the OFN device 100 include the light source 114, the housing 122, and the vertical light guide 120. This illustration also shows additional details of an embodiment of the angled surfaces 182 of the housing 122. As depicted, the angled surfaces 182 include facets to reflect the light sideways (as indicated by the arrows) so that light can travel around the circumference of the vertical light guide 120 using TIR. Also, some examples of light distribution features 184, which may further facilitate a particular distribution pattern within the vertical light guide 120, are also illustrated. In some embodiments, the light distribution feature is located in approximately a corner region of the vertical light guide to direct light out of the light emission surface at the corner region of the vertical light guide. It should also be noted that the illustrated embodiment includes a single light source 114, but other embodiment may include more than one light source 114.

Additionally, FIG. 13 illustrates the reflective surface having a protrusion with angled sidewalls to reflect at least some of the light in substantially opposing directions in the circumferential directions of the vertical light guide. In other words, the protrusion reflects some of the light to the left and some of the light to the right, within the orientation shown in FIG. 13. In this way, at least some of the light that is reflected left and right can travel around the circumference of the vertical light guide, or a portion thereof.

Figure 14:
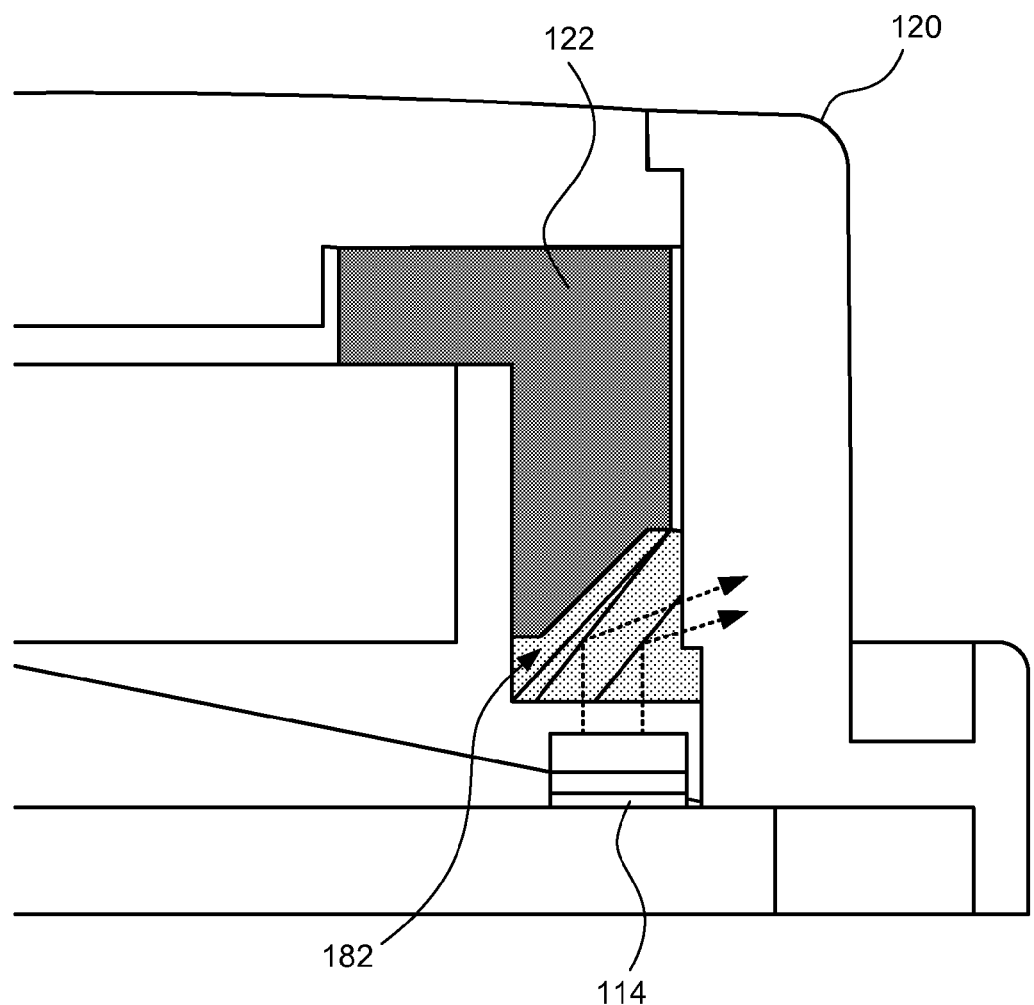
FIG. 14 depicts a cutaway view of the OFN device of FIG. 12.

FIG. 14 depicts a cutaway view of the OFN device 100 of FIG. 12. Like FIG. 12, the illustrated portions of the OFN device 100 include the light source 114, the housing 122, and the vertical light guide 120. This illustration also shows additional details of an embodiment of the angled surfaces 182 of the housing 122. As depicted, the angled surfaces 182 include facets to reflect the light outward (away from the central image sensor location) so that light can enter the vertical light guide 120.

In some embodiments, the locations and configurations of the angled surfaces 182 on the housing 122 are tailored to the particular light distribution pattern of the light source 114. For example, if the light source 114 has a very narrow beam distribution pattern, then the configuration of the angled surfaces 182 may be relatively concentrated in alignment with the beam pattern of the light guide 182. As another example, if the light source 114 is a top-emitting LED, then the configuration of the angled surfaces 182 may be directly above the location of the LED. Alternatively, if the light source 114 is a side-emitting LED, then the configuration of the angled surfaces 182 may be distributed on one or both sides of the LED. Additionally, some of the angled surfaces 182 may extend down further toward the substrate in order to align the angled surfaces 182 more closely with the center of the side-emitting beam pattern. Other embodiments may use other configurations, depending on the size, location, intensity, beam pattern, and/or other characteristics of the light source 114.

Figure 15:
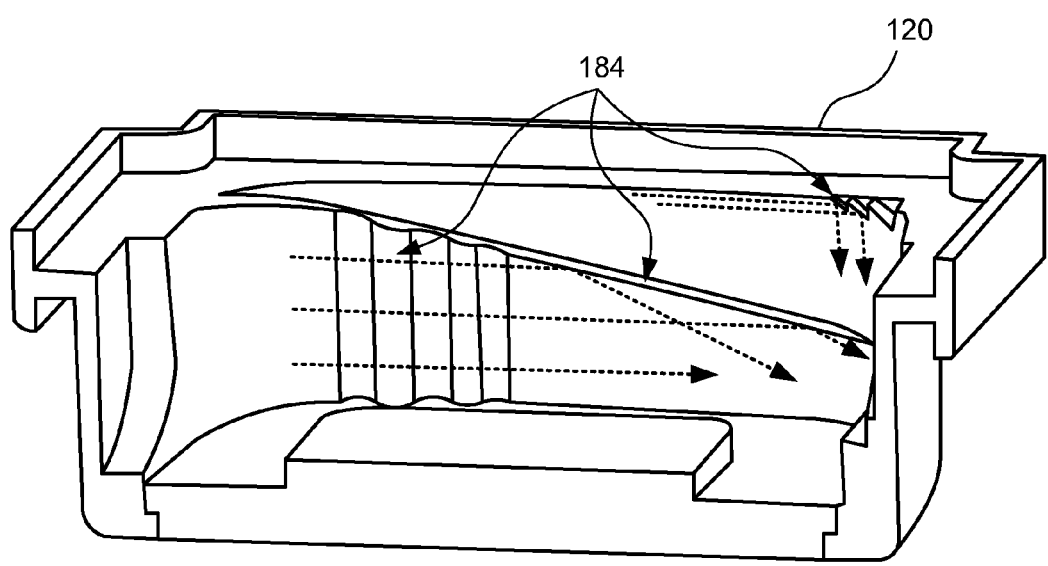
FIG. 15 depicts a cutaway view of the vertical light guide of the OFN device of FIG. 12.

FIG. 15 depicts a cutaway view of the vertical light guide 120 of the OFN device 100 of FIG. 12. The illustrated vertical light guide 120 includes several different types of light distribution features 184, including non-planar sidewalls, tiered sidewalls (i.e., with a step or ledge), and serration detents. In some embodiments, the ledge/slope sidewalls act as light guide to channel a substantial portion of light from the light source 114 to illuminate a distanced area which is at approximately the opposite side of the light guide 120 from the light source 114. This type of feature may facilitate a design that includes a single light source 114. In some embodiments, the non-planar, wavy sidewalls reduce the intensity of the light emitted from the effect lighting apparatus 110 at the position where the feature exist. In some embodiments, the serration detents disturb the light path and reflect a portion of light toward the corresponding emission surface area of the effect lighting apparatus 110. These and other similar features may be incorporated, either individually or in various combinations, to improve uniformity of the light emitted from the effect lighting apparatus 110. Additionally, some of these features also may be structural to accommodate assembly of the final device. For example, in some embodiments the step sidewalls are created to make space for the sensor 112 to fit in.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A light guide assembly for an optical finger navigation (OFN) device which generates a navigation signal in response to a movement detected at a navigation surface based on light reflected from a user's finger, the light guide assembly comprising:
   a housing with vertical walls formed of a substantially opaque material, wherein the housing defines:
      an interior space with dimensions sufficient to house an OFN sensor module; and
      a navigation window for alignment between a sensor array location of the OFN sensor module and a navigation surface; and
   a vertical light guide with vertical walls formed of a substantially translucent material, wherein the vertical light guide is configured to guide light from a light source approximately at a base of the vertical light guide toward a light emission surface which circumscribes at least a portion of the navigation window defined by the housing.

2. The light guide assembly of claim 1, wherein the housing further comprises a reflective surface to reflect the light from the light source into the vertical light guide, wherein the reflective surface is a multi-faceted surface with a non-conductive vacuum metallization (NCVM) coating.

3. The light guide assembly of claim 1, wherein the vertical light guide further comprises a light distribution feature, wherein the light distribution feature comprises a geometrical variation in a physical structure of the vertical light guide to redirect light around or out of the vertical light guide.

4. A computerized device comprising:
   a screen for visual display of a graphical image;
   an optical finger navigation (OFN) device for detecting user inputs based on light reflected from a user's finger at a navigation surface to manipulate at least a portion of the graphical image on the screen; and
   an effect lighting apparatus disposed to circumscribe the navigation surface of the OFN device, wherein the effect lighting apparatus is configured to provide a visual indicator of a location of the navigation surface of the OFN device relative to the screen, without interfering with the functionality of the OFN device.

5. An optical finger navigation (OFN) device comprising:
   an OFN sensor module coupled to a circuit substrate, wherein the OFN sensor module is configured to generate a navigation signal in response to a movement detected at a navigation surface based on light reflected from a user's finger;
a light source coupled to the circuit substrate, wherein the light source is configured to generate light; and
a vertical light guide comprising a light emission surface disposed to circumscribe a navigation window at the navigation surface, wherein the vertical light guide is configured to receive the light from the light source and to guide the light toward the light emission surface.

6. The optical finger navigation device of claim 5, wherein the vertical light guide comprises a substantially translucent ring.

7. The optical finger navigation device of claim 5, further comprising a housing disposed between the OFN sensor module and the vertical light guide, wherein the housing comprises a substantially opaque vertical wall circumscribing the perimeter of the OFN sensor module to shield the OFN sensor module from the light in the vertical light guide.

8. The optical finger navigation device of claim 7, wherein the housing further comprises a reflective surface to reflect the light from the light source into the vertical light guide.

9. The optical finger navigation device of claim 8, wherein the reflective surface is a multi-faceted surface with facets oriented along intersecting, non-parallel planes.

10. The optical finger navigation device of claim 8, wherein the reflective surface comprises a non-conductive vacuum metallization (NCVM) coating applied to the housing.

11. The optical finger navigation device of claim 8, wherein the reflective surface comprises a protrusion with angled sidewalls to reflect at least some of the light in substantially opposing directions in the circumerential directions of the vertical light guide.

12. The optical finger navigation device of claim 7, wherein the housing further comprises a top flange coupled to the vertical wall, wherein the top flange extends horizontally over a perimeter portion of a top surface of the OFN sensor module, wherein the top flange defines a navigation window between the navigation surface and a sensor array of the OFN sensor module.

13. The optical finger navigation device of claim 5, wherein the vertical light guide further comprises a light distribution feature, wherein the light distribution feature comprises a geometrical variation in a physical structure of the vertical light guide to redirect light around or out of the vertical light guide.

14. The optical finger navigation device of claim 13, wherein the light distribution feature is defined by one or more of the following:
a non-planar sidewall with an undulating pattern;
a tiered sidewall with a ledge to channel light around the vertical light guide; or
a serration detent to cause total internal reflection.

15. The optical finger navigation device of claim 13, wherein the light distribution feature is located in approximately a corner region of the vertical light guide to direct light out of the light emission surface at the corner region of the vertical light guide.

16. The optical finger navigation device of claim 5, further comprising a transitional light guide disposed between the vertical light guide and the circuit substrate, wherein the transitional light guide is configured to provide a light guide path for the light from the light source to an incident light surface of the vertical light guide.

17. The optical finger navigation device of claim 16, wherein:
the light source comprises a top-emitting light emitting diode (LED); and
the transitional light guide comprises a light pipe, wherein the light pipe comprises:
a bottom surface to receive light from the top-emitting LED;
opposing protrusions extending in a direction substantially parallel to a plane of the bottom surface;
at least one reflective surface to internally reflect and redirect light within the light pipe from the bottom surface to the opposing protrusions; and
at least one emission surface to emit light out of the light pipe and into the incident light surface of the vertical light guide.

18. The optical finger navigation device of claim 5, wherein the vertical light guide comprises a light interface surface to receive the light from the light source, wherein the light interface surface comprises a reflective angular protrusion to reflect the light from the light source into a vertical transmission interface of the vertical light guide.

19. The optical finger navigation device of claim 5, further comprising a cover for the vertical light guide, wherein the cover for the vertical light guide comprises:
a central navigation plate that is substantially translucent to a wavelength of light that is detectable by the OFN sensor module, wherein a top surface of the central navigation plate comprises the navigation surface; and
a diffuse transmission ring substantially circumscribing the central navigation plate, wherein a bottom surface of the diffuse transmission ring is configured to substantially align with a top surface of the vertical light guide, and a top surface of the diffuse transmission ring comprises the light emission surface to emit the light from the vertical light guide as effect lighting surrounding the navigation surface.

20. The optical finger navigation device of claim 19, further comprising a non-conductive vacuum metallization (NCVM) coating applied to the top surface of the diffuse transmission ring of the cover.

* * * * *